2,836,619
PURIFICATION OF ALKARYL SULFONATES

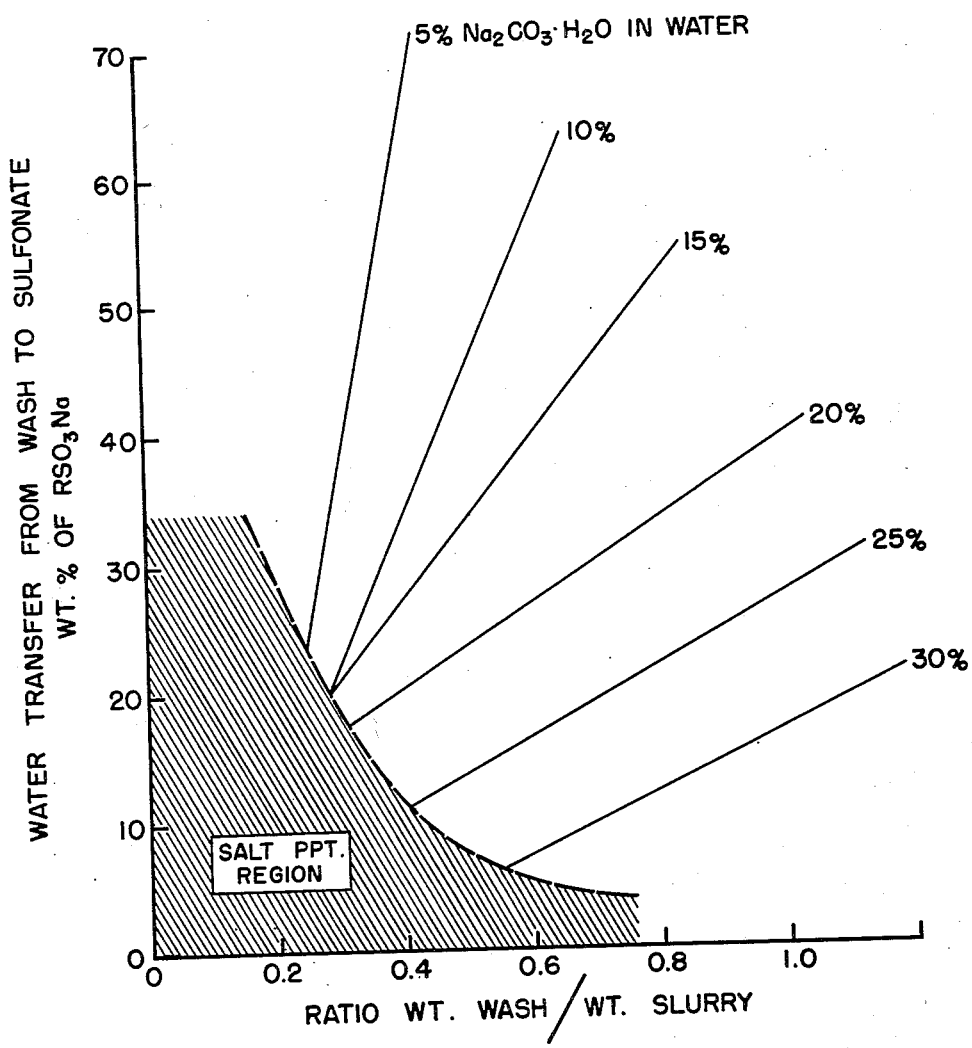

James C. Kirk and Warren W. Woods, Ponca City, Okla., assignors to Continental Oil Company, Ponca City, Okla., a corporation of Delaware Application November 15, 1954, Serial No. 468,613

12 Claims. (Cl. 260—505)

This invention relates to the production of alkaryl sulfonates which are substantially free of inorganic sulfates and sulfites.

In the production of alkali metal alkaryl sulfonates a sulfonic acid is first produced by treating an alkaryl hydrocarbon with sulfuric acid, oleum, or sulfur trioxide. Whichever method is used an excess of sulfur oxides will remain in the product as $SO_2$, $SO_3$, and hydrates which are difficult if not impossible to remove. It, therefore, follows that if a sulfonic acid containing these impurities is neutralized by treatment with a base such as an alkali hydroxide, these contaminants are converted to alkali sulfates and sulfites. This inorganic salt content tends to decrease the water solubility of the alkali sulfonate and often results in formation of a slurry rather than a solution when the neutralization mass is diluted with water to the 10-60 percent active content range. Such a concentrated product substantially free of these inorganic salts is desirable for use in liquid detergents. Such a product can be used also as an agent in dispersing, emulsifying, wetting, rewetting, foaming, penetrating, and in other surface phenomena where the presence of inorganic salts is undesirable. In one method it has been suggested that the neutralization of the sulfonic acid be carried out in the presence of alcohol as a solvent. When this is done the inorganic salt precipitates to a greater or less extent, the actual amount precipitated being dependent upon the relative amounts of the alcohol, water, and the sulfonic acid. In order to remove the precipitated material when such a procedure is followed, it is necessary to employ filtration or centrifuging operations, which operations require specialized costly equipment that is difficult to operate and maintain.

It is, therefore, a principal object of the present invention to provide a process for the purification of alkali alkaryl sulfonates which obviates the disadvantages of the prior art. It is another object of our invention to provide a convenient and easily operable process for the production of alkaryl sulfonates which are substantially free of inorganic sulfates and sulfites. Other objects and advantages of the present invention will become apparent from the following description of our invention.

In brief, the objects of our invention are obtained by a process which may be described in tabular form as follows:

(1) Dilution of the sulfonation product with a solvent for the desired neutralized sulfonate.

(2) Neutralization with an alkaline agent.

(3) Agitation with an aqueous alkali carbonate wash solution, allowing the mixture to stratify into liquid phases, and separating the phases.

Steps 1 and 2 above may be carried out in that order or neutralization may precede dilution with equal results.

An especially valuable feature of the process is that the liquid layers are formed without formation of a solid salt precipitate. The layers are readily separable by gravity settling, thus yielding a liquid product layer substantially free of inorganic sulfates or sulfites.

The solvent may be a lower molecular weight alcohol, such as methanol, ethanol, n-propanol iso-propanol, the butanols, pentanols, and various glycols such as ethylene glycol, propylene glycol, hexamethylene glycol, etc. Hydrocarbons, either aliphatic, aromatic, or cycloaliphatic also may be used. Those having a boiling point of from about 25° C. to 150° C. are very useful; as for example, the pentanes, hexanes, cyclohexane, benzene, toluene, octanes, petroleum naphtha. Where water soluble sulfonate concentrates are desired, a water miscible solvent such as ethanol, denatured ethanol, and isopropanol is preferred. In some cases, a normally water insoluble sulfonate can be made water miscible by incorporation of sufficient solvent.

Where oil soluble sulfonate concentrates are desired, either water or oil miscible solvents may be used provided such solvents are later to be removed by distillation, etc. If removal is not indicated, oil miscible solvents are generally preferred.

The amount of solvent that may be used may be varied from about 0.6 to 5.0 parts by weight of solvent to 1 part by weight of sulfonation product depending on the particular sulfonation product, the solvent, the amount and concentration of the aqueous sodium carbonate solution, and the amount of water that is desired in the final purified product. We prefer a ratio of about 0.7 to 1.5 parts of solvent to 1 part of sulfonation product.

It is recognized that the optimum ratios depend somewhat on the amount of sulfonic acid contained in the sulfonation product. In conventional oleum sulfonation, the separation of spent sulfonating agent is such that the sulfonation mass consists of 85-95 percent sulfonic acid with the remainder being water and inorganic acids of sulfur. The amount of solvent used is based on the amount of sulfonic acid content, and the ratio as used above and in the appended claims pertains to 90 percent sulfonic content. This ratio would consequently be adjusted slightly for sulfonation masses of different sulfonic contents. Similarly, the amount of wash required is, of course, dependent on the amount of sodium sulfate to be dissolved, hence also is dependent on the purity of the sulfonation mass. The wash ratios cited hereinafter and in the appended claims therefore apply strictly to 90 percent sulfonic acid and would be adjusted slightly for sulfonation masses of different sulfonic contents.

As to the neutralizing agent, that may be an alkaline agent such as the hydroxides and carbonates of the alkali metals. Where foaming is a problem the use of the hydroxide of the alkali metal is preferred. The alkaline agent may be used in anhydrous form or in solution in a solvent including water and the lower alcohols such as methanol, ethanol, or isopropanol. Preferred solutions are: aqueous sodium hydroxide, aqueous sodium carbonate, or ethanolic sodium hydroxide. Obviously, either potassium hydroxide or carbonate may be substituted for the corresponding sodium compound. The upper limit of the concentration is restricted only by solubility or ease of workability of the alkaline agent in the solvent. A 25 to 60 percent sodium hydroxide solution in water is preferred.

The amount and concentration of the alkali carbonate wash solution to be used relative to the sulfonation product depends on the amount of impurities present in the sulfonation product, the degree of purification desired, and the amount of water that can be tolerated in the purified product. In general, the lower the concentration of the alkali carbonate the greater the amount of water remaining in the purified product and the greater the loss of purified product in the wash carbonate solution. Since some water is always transferred to the sulfonate phase, the wash solution becomes more concentrated and carbonate precipitation may occur at any initial carbonate concentration if insufficient ratio of wash solution to sulfonation product is used. The practical limits of carbonate concentration are from 5 percent to 30 percent as shown in the figure. Data shown in this figure were obtained at 25° C., using a sodium sulfonate of a 318 molecular weight alkyl benzene, sodium carbonate monohydrate, and isopropanol alcohol. With the higher carbonate contents, it can be seen from this figure that increased amounts of wash are necessary to prevent precipitation and that such increase in amount of wash results in increased water transfer to the product. For economic reasons, therefore, we prefer a carbonate concentration of from 15 to 25 percent and ratio of wash solution to sulfonation mass of about 0.75:1 to about 1.5:1.

At the higher concentrations and lower ratios of wash solution elevated temperatures may be employed to eliminate precipitation of salts. Thus we may operate at temperatures up to the boiling point of the solvent to permit use of more concentrated carbonate solution and/or a lower ratio of wash liquid to sulfonation mass. For some sensitive sulfonates we may not operate above about 10° C. Our preferred temperature range is about 20 to 60° C.

In order to disclose the nature of the present invention still more clearly, the following illustrative examples will be given. It is to be understood that the invention is not to be limited to the specific conditions or details set forth in these examples except insofar as such limitations are specified in the appended claims. Parts given are parts by weight.

EXAMPLE 1

Five hundred parts of an alkylated benzene hydrocarbon having an average molecular weight of 318 was sulfonated by treating with 850 parts of 20 percent oleum. The reaction mass was quenched with 180 parts of ice, allowed to separate into two layers and the lower layer consisting of 870 parts of spent acid was discarded. 660 parts of crude sulfonic acid was recovered from the upper layer which analyzed 4.10 meq./g. of total acidity and 2.33 meq./g. of sulfonic acid. This crude acid was diluted with 494 parts of isopropanol (0.75 part of solvent to 1 part of crude sulfonic acid) and then the mixture was neutralized with 217 parts of 50 percent aqueous sodium hydroxide solution. About 1330 parts of aqueous alcoholic sodium sulfonate slurry was obtained analyzing 48.2 percent sodium sulfonate and 6.2 percent inorganic salt. This slurry was treated to free it of inorganic salts by washing with 660 parts of a 20 percent sodium carbonate solution (ratio of wash solution to crude sulfonic acid of 1:1) and 1625 parts of product obtained analyzing 39.0 percent sodium sulfonate and 0.05 percent sodium sulfate.

Similar experiments were made in accordance with Example 1 with the exception that various ratios of sodium carbonate wash solutions to sulfonation product and various concentrations of sodium carbonate wash solutions were used. The data obtained are reported in the table below:

Table
EFFECT OF CONCENTRATION AND AMOUNT OF $Na_2CO_3$ WASH SOLUTION ON 100 G. OF ALCOHOLIC SULFONATE SOLUTION

| Wash Solution | | Parts Product | Analysis of Product | |
|---|---|---|---|---|
| Conc., Percent | Weight Per Weight of Sulfonate | | Active Sulfonate | Inorganic Salt |
| 10 | 0.75 | 124.9 | | |
| 10 | 1.00 | 144.3 | 39.6 | 0.49 |
| 10 | 1.33 | 103.8 | | |
| 15 | 0.75 | 123.2 | | |
| 15 | 1.00 | 131.3 | 38.9 | 0.04 |
| 15 | 1.33 | 144.0 | | |
| 20 | 0.75 | $Na_2CO_3$ Precipitates | | |
| 20 | 1.00 | 122.1 | | |
| 20 | 1.33 | 129.1 | 39.0 | 0.05 |
| 25 | 0.75 | $Na_2CO_3$ Precipitates | | |
| 25 | 1.00 | 112.2 | | |
| 25 | 1.33 | 118.1 | 41.2 | 0.02 |

EXAMPLE 2

Two hundred fifty parts of an alkylated benzene hydrocarbon boiling about 140° to about 210° C. at 20 mm. pressure and molecular weight of about 246 was sulfonated with 312 parts of 20 percent oleum. Then 137 parts of ice was added, the mixture agitated and after settling a lower phase of 295 parts of 63 to 65 percent sulfuric acid separated and discarded. An upper phase weighing 400 parts and analyzing 83.2 percent active sulfonic acid and 9.3 percent inorganic acid as sulfuric acid was obtained and neutralized with 50 percent aqueous sodium hydroxide while maintaining the temperature below 50° C., yielding 545 parts of sodium sulfonate slurry. This slurry was diluted with 300 parts of isopropanol (0.75 part of solvent to 1 part of crude sulfonic acid) and washed with 400 parts of 20 percent aqueous sodium carbonate (ratio of wash solution to crude sulfonic acid of 1:1). The clear product analyzed 37.1 percent active sodium sulfonate and 0.05 percent sodium sulfate.

EXAMPLE 3

One hundred parts of crude sulfonic acid obtained by sulfonating an alkylated benzene hydrocarbon having an average molecular weight of 246 with 20 percent oleum followed by an ice quench and separation of spent acid was diluted with an equal weight of isopropyl alcohol and neutralized with 50 percent aqueous sodium hydroxide. One hundred parts of the resulting slurry was contacted with 100 parts of 20 percent aqueous sodium carbonate, allowed to settle and the lower aqueous phase discarded. The clear aqueous alcoholic product analyzed about 0.1 percent sodium sulfate.

EXAMPLE 4

One hundred parts of a crude sulfonic acid obtained by sulfonating 75 parts of an alkylated benzene hydrocarbon having an average molecular weight of 318 with 127 parts of 20 percent oleum, quenching with 27 parts of ice, and separating spent acid, was diluted with 71 parts of isopropanol and neutralized with 32.6 parts of 50 percent sodium hydroxide. This crude alcoholic sulfonate slurry was washed with 106 parts of 24 percent sodium carbonate monohydrate (equivalent to 20.6 percent anhydrous sodium carbonate). A clean separation of the wash solution was not obtained at room temperature but on warming to 49° C. separation took place rapidly. The clear product analyzed 42.2 percent active sodium sulfonate, 0.05 percent sodium sulfate, and 1.6 percent free oil and gave clear bright solutions on 1:1 and 1:10 dilution with water.

On repeating the foregoing experiment using the same proportions of materials except that 69 and 61 parts of isopropyl alcohol was used in place of 71 parts of isopropyl alcohol, clear products containing only slightly more sodium sulfate were obtained. These products did not give clear bright solutions on dilution with water because of insufficient alcohol to solubilize this high molecular weight sulfonate.

EXAMPLE 5

One hundred parts of crude sulfonic acid obtained by sulfonating an alkylated benzene hydrocarbon having an average molecular weight of 318 was neutralized with 50 percent aqueous sodium hydroxide. To the neutralized slurry was added 75 parts of benzene and 100 parts of 20 percent sodium carbonate and the mixture agitated efficiently. The mixture was allowed to settle and the clear benzene solution of the sulfonate drawn off. It analyzed 0.03 percent sodium sulfate.

A repeat of the foregoing experiment using ethylene glycol or 1,6-hexamethylene glycol in place of benzene gave clear ethylene glycol or 1,6-hexamethylene glycol solutions which had low contents of sodium sulfate.

EXAMPLE 6

One hundred parts of a furfural extract was sulfonated with 75 parts of fuming sulfuric acid (23 percent excess $SO_3$). After the sulfonation was completed, 95 parts of naphtha (70° A. P. I.) was added to reduce the viscosity of the sulfonation mass and allow separation of spent acid. The mixture was allowed to settle for two hours and 113.6 parts of spent acid was removed.

The naphtha solution of sulfonic acid (121 parts, 105 meq./g. total acidity) which still contained some sulfuric acid was neutralized with a 50 percent solution of sodium hydroxide. The neutralized product was mixed with 44.4 parts of isopropyl alcohol and 60 parts of water. This treatment resulted in formation of two liquid phases. The upper layer was discarded and the lower layer of alcohol, water, sulfonate, and inorganic salts was washed with a solution of 17 parts of soda ash in 43.7 parts of water. The alcohol and other solvents were removed by distillation to yield a product containing 64 percent sulfonate and a .09 percent sodium sulfate.

EXAMPLE 7

A glass-lined Pfaudler reactor was charged with 183 parts of dodecene alkylated benzene boiling 315° to 395° C. and having an average molecular weight of 300 was sulfonated with 274 parts of 20 percent oleum at about 50° C. and the reaction quenched with 40 parts of ice. After settling, 243.5 parts of spent acid analyzing 89.1 percent was withdrawn and discarded. The 251.5 parts of crude sulfonic acids had a total acidity of 4.38 milliequivalents per gram of which 2.29 milliequivalents per gram was sulfonic acids, and 3.46 percent free oil.

Sixty-eight parts of the crude acids so obtained was neutralized with 27 parts of 50 percent aqueous sodium hydroxide and diluted with 51 parts of isopropyl alcohol (0.75 part of solvent to 1 part of crude sulfonic acid). The alcoholic slurry was then contacted with 74.75 parts of 24 percent aqueous sodium carbonate monohydrate (ratio of wash solution to crude sulfonic acid of 1:0.91), at a temperature of 63° C. After settling, 84.25 parts of salt solution was drawn off leaving 132 parts of clear aqueous alcoholic product analyzing 44.3 per cent active sodium sulfonate, 1.45 percent free oil and 0.02 percent sodium sulfate and having a density of 8.144 pounds per gallon. This material remained bright and clear on 1:1 to 1:10 dilution with water.

Examples 1, 2, and 3 were repeated except an equivalent amount of potassium carbonate was substituted for the sodium carbonate used in those examples. The final product obtained was to all measurable respects identical to that obtained in the Examples 1, 2, and 3.

It is apparent that many modifications and variations of the invention as hereinbefore set forth may be made without departing from the spirit and scope thereof. The examples given are by way of illustration only and the invention is limited only by the terms of the appended claims.

We claim:

1. The process of producing an alkaryl sulfonate substantially free of inorganic sulfates and sulfites which comprises diluting a crude alkaryl sulfonic acid prepared by sulfonating an alkaryl hydrocarbon with a sulfonating agent selected from the group consisting of oleum and sulfuric acid with an organic solvent having a boiling point within the range of about 25 to about 250° C., neutralizing said sulfonic acid by adding thereto an alkali metal hydroxide, contacting the mixture with an aqueous alkali metal carbonate solution, allowing the mixture to separate into at least two layers, a non-aqueous layer comprising the organic solvent, the alkali metal alkaryl sulfonate, and a minor amount of water, an aqueous layer comprising water and inorganic salts, separating said non-aqueous layer from said aqueous layer, and then obtaining the purified sulfonate from said non-aqueous layer by removing therefrom said organic solvent and water.

2. The process of claim 1 wherein the concentration of the aqueous alkali carbonate wash solution varies from about 5 to about 30 percent.

3. The process of claim 1 wherein the concentration of the aqueous alkali carbonate solution varies from about 15 to 25 percent.

4. The process of claim 1 wherein the organic solvent is an aliphatic alcohol.

5. The process of claim 1 wherein the alkali metal carbonate is sodium carbonate.

6. The process of claim 1 wherein the alkali metal carbonate is potassium carbonate.

7. The process of claim 1 wherein the temperature of operation varies from about 10 to about 250° C.

8. The process of claim 1 wherein the temperature of operation varies from about 20 to about 60° C.

9. The process of claim 1 wherein the amount of the organic solvent varies from about 0.6 to about 5.0 parts by weight per part by weight of the sulfonic acid.

10. The process of claim 1 wherein the amount of the organic solvent varies from about 0.7 to about 1.5 parts by weight per part by weight of the sulfonic acid.

11. The process of claim 1 wherein the amount of the aqueous alkali carbonate solution varies from about 0.25 to about 3.0 parts by weight per part by weight of the sulfonic acid.

12. The process of claim 1 wherein the amount of the aqueous alkali carbonate solution varies from about 0.75 to about 1.5 parts by weight per part by weight of the sulfonic acid.

References Cited in the file of this patent

UNITED STATES PATENTS

| | | |
|---|---|---|
| 1,981,799 | Buc | Nov. 20, 1934 |
| 2,567,854 | Nixon | Sept. 11, 1951 |
| 2,594,875 | Condit | Apr. 29, 1952 |
| 2,620,353 | Lippincott et al. | Dec. 2, 1952 |
| 2,687,420 | Brady | Aug. 24, 1954 |
| 2,688,633 | Cohen | Sept. 7, 1954 |

Disclaimer 2,836,619.—*James C. Kirk* and *Warren W. Woods*, Ponca City, Okla. PURIFICATION OF ALKARYL SULFONATES. Patent dated May 27, 1958. Disclaimer filed Jan. 26, 1973, by the assignee, *Continental Oil Company*.

Hereby disclaims the remaining term of said patent.

[*Official Gazette May 29, 1973.*]